April 23, 1968 J. M. KULKA 3,379,311
SEWAGE TREATMENT AND DISPOSAL SYSTEMS
Filed June 10, 1965 2 Sheets-Sheet 2
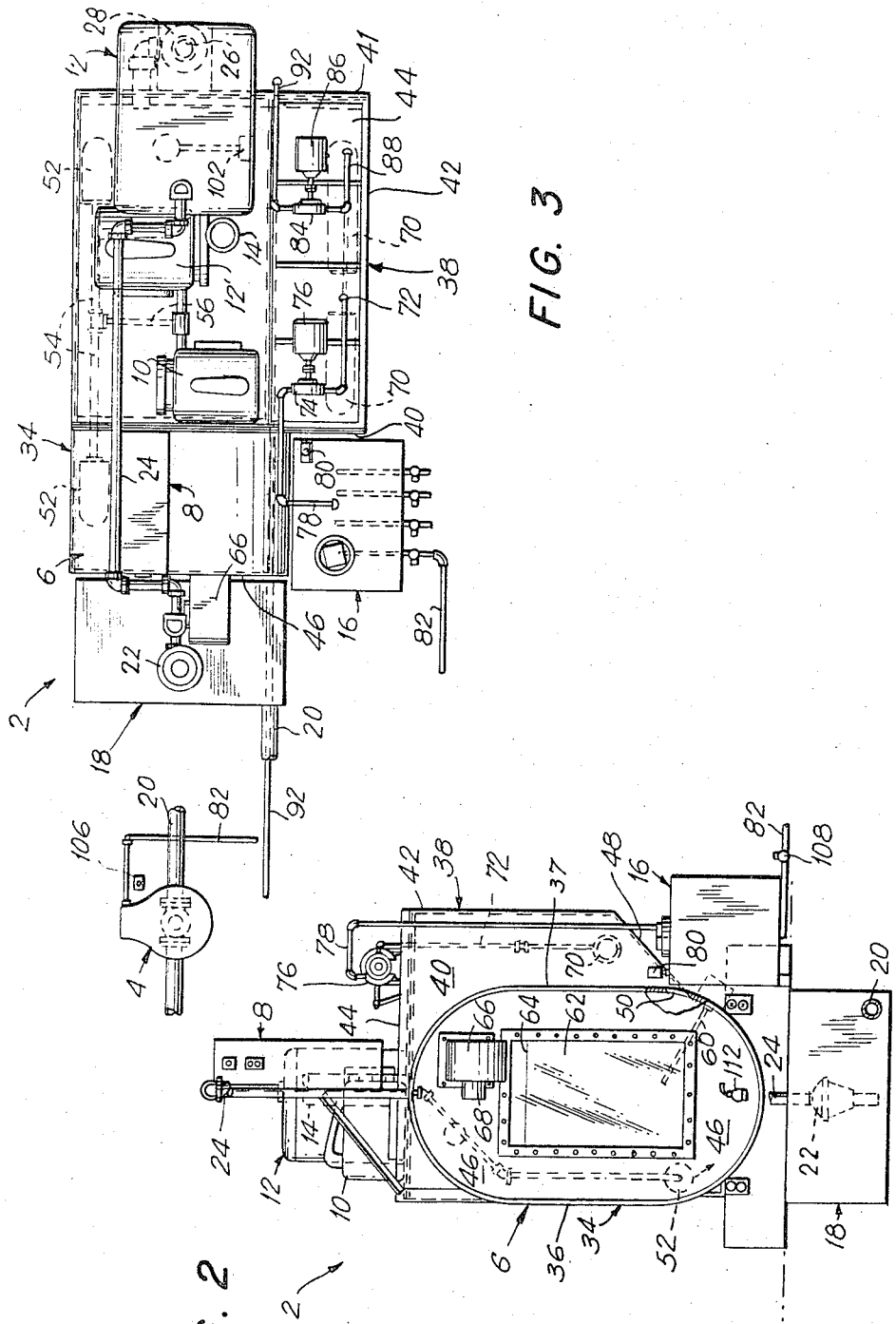
INVENTOR.
JAMES M. KULKA
BY
Curtis, Morris & Safford
ATTORNEYS

United States Patent Office 3,379,311
Patented Apr. 23, 1968

3,379,311
SEWAGE TREATMENT AND DISPOSAL SYSTEMS
James M. Kulka, 4903 Willow Springs Road,
La Grange, Ill. 60525
Filed June 10, 1965, Ser. No. 462,987
12 Claims. (Cl. 210—97)

ABSTRACT OF THE DISCLOSURE

A sewage treatment and disposal system where a controlled flow of sewage from toilet units is conveyed to a treating tank. In the treating tank the sludge is settled and the liquid is aerated by diffusers to oxidize bacteria. The treating tank includes an air chamber having an air blower and heater by which a controlled evaporation of the aerated liquid is effected to maintain the liquid content of the system at a predetermined amount. Clear liquid is removed from the treating tank to a clear water tank from whence it is utilized in flushing the toilet units.

---

Figure 1:
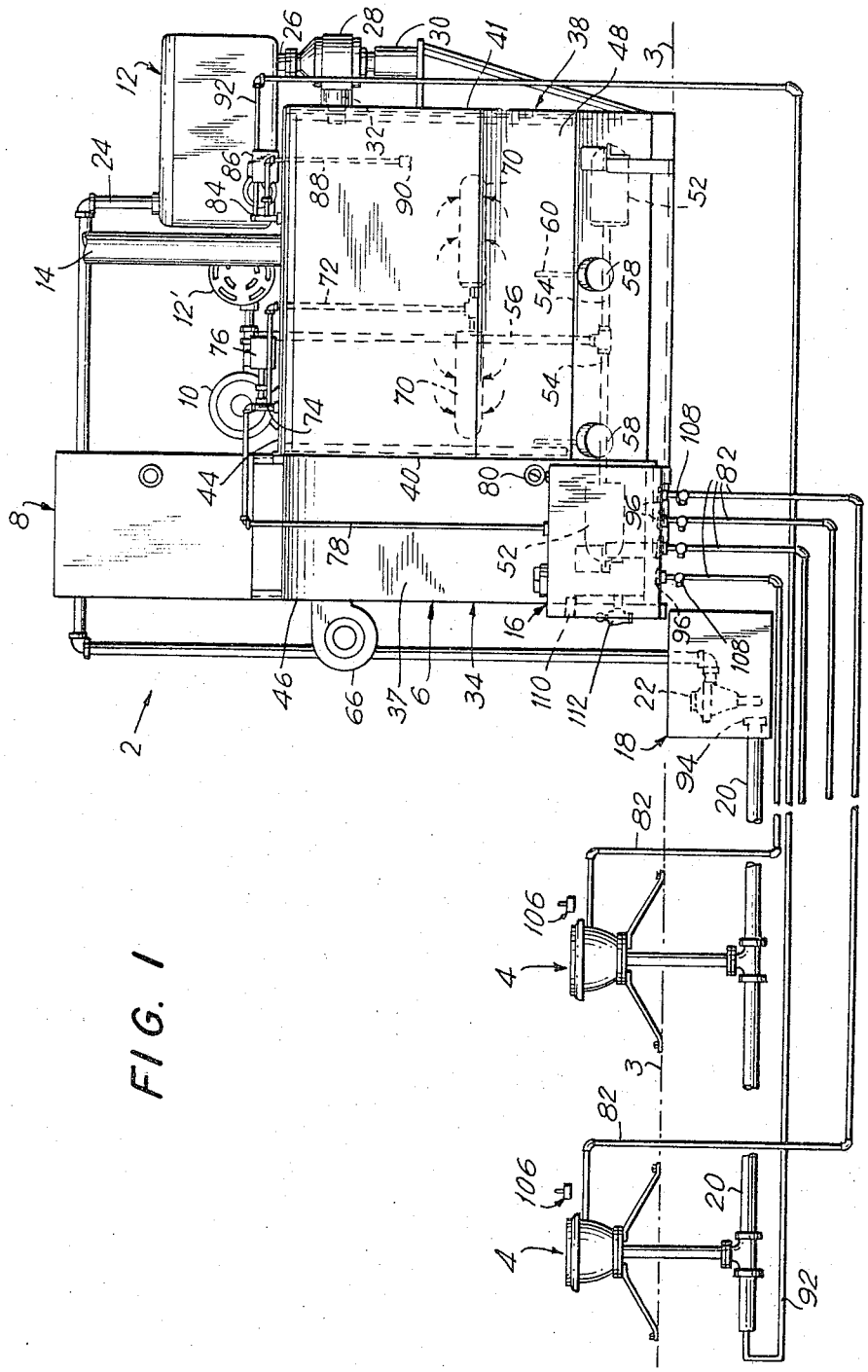

This invention relates to self-contained sewage treating or disposal systems, and more particularly to such systems of the type which may be portable in the sense that one may be moved from place-to-place, either in a mobile vehicle or otherwise as an assembled unit.

An object of this invention is to provide waste disposal systems which are free of the difficulties which have been encountered with similar prior systems. Another object is to provide mobile waste disposal systems which do not require the attentions and service required by prior systems. Another object is to provide waste disposal systems which may be installed as stationary or permanent units without the necessity for connection to sewerage outlets. A further object is to provide for the above with equipment which is efficient, dependable, compact and adaptable to various conditions of operation and use. A further object is to provide for the above with equipment which requires only routine and intermittent attention and which is free of objectionable characteristics. These and other objects will be in part obvious and in part pointed out below.

In the drawings:
FIGURE 1 is a somewhat schematic side elevation of one embodiment of the invention;
FIGURE 2 is a vertical end view of the treating unit of FIGURE 1; and
FIGURE 3 is a top plan view of the system of FIGURE 1.

Referring to FIGURE 1 of the drawings, a waste disposal system 2 receives waste from a number of toilet units 4 (two of which are shown) in a manner discussed below. System 2 has a main water tank assembly 6, which is mounted at the level of the floor 3. At the top of tank 6 there are an electric control panel 8, a pair of air compressors 10 and 12' driven by electric motors, an upper waste tank 12, and an exhaust stack 14. At the base of the tank assembly 6 and above the level of floor 3 is a purified water tank 16, and beneath the level of floor 3 there is a waste tank 18. A waste line 20 extends from the units 4 to deliver waste into the bottom of tank 18, and a sump pump 22 is positioned within tank 18 and has its discharge pipe 24 extending upwardly and thence across to the top of tank 12. Pump 22 is a self-contained submersible pump having an enclosed electric motor, and it draws waste from the bottom of tank 18 and discharges it into tank 12. Positioned beneath tank 12, with an inlet connection pipe 26 to the bottom of the tank, is a grinder or macerator 28 which is driven by an electric motor 30 and operates to grind the waste and to discharge it through a pipe 32 into the upper portion of tank 6.

Referring to FIGURE 2, tank assembly 6 has two separate but interconnected tanks which form separate zones, there being a treating or digester tank 34 and a settling or "clear water" tank 38. Tank 34 has rear and front vertical walls 36 and 37, respectively, and semi-cylindrical top and bottom walls so that the tank is generally oval in vertical, transverse cross-section. Auxiliary tank 38 has a vertical side wall 42, end walls 40 and 41 (see FIGURE 3), a horizontal top wall 44 (FIGURE 2), and a bottom wall 48 which is at an angle of 45° from the horizontal so that it extends downwardly and inwardly toward the bottom of tank 34. As shown best in FIGURES 1 and 3, tank 38 is shorter than tank 34 with its end wall 41 flush with the end wall of tank 34 but with end wall 40 positioned substantially to the right of the left-hand end wall 46 of tank 34. Exhaust stack is connected to the top of tank 34 so as to provide the exhaust of air and vapor from the top of the tank. Wall 37 has its bottom edge spaced upwardly from wall 48 so as to provide a rectangular opening 50 between the interior of tank 34 and the bottom of the "clear water" tank 38. As will be explained more fully below, the waste material is discharged in a stream of water into tank 34 and the waste is digested within this tank, and "clear water" is withdrawn from tank 38 so that the water flows from tank 34 through opening 50 into tank 38.

Positioned within tank 34 are two air diffusers 52 (FIGURES 1 and 3) which are connected by pipes 54 and 56 to the air compressors 10 and 12'. The compressed air from diffusers 52, preferably ceramic, is directed downwardly and causes a continuous circulation of the water and waste in tank 34, counterclockwise in FIGURE 2. Two electric heaters 58 are mounted upon the lower portion of tank 34, each with an external connection and control box and a heater element 60 projecting into the waste and water within the tank. A window 62 in the end wall 46 of tank 34 permits observation of the conditions within the tank, and the water level within the tank, as indicated at 64. Mounted upon the end wall 46 of the tank is a blower 66 which is driven by an electric motor 68, and which blows air into the tank 34 above the water line, and the air is discharged through the stack 14.

Positioned in the lower portion of tank 38 are two cylindrical discharge ceramic filter units 70 which are connected through a pipe 72 to a water pump 74 driven by an electric motor 76. Pump 74 withdraws the "clear water" from tank 38 and discharges it through a pipe 78 into the top of tank 16. Tank 16 is closed and a slightly elevated pressure is maintained in it, as indicated by a gauge 80. Water is discharged from the bottom of tank 16 through individual pipes 82 extending respectively to and providing flushing water for the various toilet units 4.

Referring to the upper right-hand portion of tank assembly 6, there is a pump 84 driven by an electric motor 86 and having an intake pipe 88 which extends into tank 38 and has at its end a self-closing intake valve 90. When pump 84 is operated, valve 90 opens automatically so that water is withdrawn freely from the tank, but when the pump is stopped, valve 90 recloses automatically. The discharge pipe 92 from pump 84 extends to the remote end of waste line 20 so that when pump 84 is operated water is withdrawn from tank 38 and is discharged through pipe 92 to the remote end of waste line 20. This provides a substantial flow of water through waste pipe 20 to tank 18 so as to insure that the waste from the units 4 is moved along and delivered to tank 18.

As shown best in FIGURE 1, the outlet waste pipe 20 is provided with a bar-screen 94, and each of the flush water pipes 82 has a screen 96 at its inlet from tank 16. Each of pipes 82 has a normally-closed solenoid valve 108, the solenoid of which is energized to open the valve and flush its toilet unit. Pump 74 is of the impeller type, and its operation is under the control of a pressure switch 110 in tank 16. Switch 10 closes upon a drop in the pressure so as to start motor 76 and deliver additional water to tank 16, and the switch opens upon a rise in pressure. Illustratively, a pressure of the order of 12 pounds per square inch is maintained in the tank.

Positioned within tank 12 is a float-controlled switch 102 which is opened when its float is lifted by the rise of the liquid to a predetermined level. Switch 102 controls grinder 28 so as to start the grinder when the water in tank 12 reaches that predetermined level and it stops the grinder when a minimum level is reached.

Each of the toilet units 4 has an electric switch 106 which is normally opened, but which is closed manually to energize the solenoid of its valve 108. The closing of any one of the switches 106 also starts motor 86 so as to pump water from tank 38 through line 92 to the remote end of waste pipe 20. The momentary closing of a switch 106 causes its solenoid 108 and motor 84 to remain energized for a period of twenty seconds or for such other period of time desired.

As water is withdrawn from tank 38 through units 70, there is a slow upward flow of water from tank 34 through opening 50. Any solids carried upwardly through opening 50 settle onto bottom wall 48 and slide downwardly through opening 50 into tank 34. Hence, a body of "clear water" is maintained within tank 38.

During normal periods of use, blower 66 operates continuously so as to maintain continuous air circulation into the chamber in the top of the treating tank and thence up the exhaust stack 14. Compressors 10 and 12' also supply compressed air to the body of fluid to maintain agitation of the effluent or water mixture in tank 34. Heaters 60 are thermostatically controlled to maintain a predetermined fluid temperature. This system operates upon a more or less fixed quantity of fluid, and an important feature is the provision of sufficient air flow across the top of the body of fluid in the treating tank and up the exhaust stack to insure the desired amount of evaporation. Initially, the system is filled with fresh water delivered to tank 34 from a hose or other supply (not shown), and thereafter the evaporation is so controlled as to dispose of the fluids added by use. The passage of evaporated water and other vapors from the unit does not create an objectionable condition in the surrounding atmosphere. The waste materials are oxidized, and the only residue that must be removed from the system is sludge, and that is done through faucet 112 in the end of tank 34. Such removal of sludge is necessary only after long use, e.g. after a year, or when the unit is to be removed to another location and it is desirable to reduce the weight.

As used herein the term "clear water" is water which is relatively clear and odor-free and which is, in all respects, satisfactory for flushing purposes. The temperature of the fluid in the treating tank is maintained within the proper range to provide the desired or maximum rate of oxidation, although the temperature at all times is below that which would produce sterilization of the waste materials. The macerator or grinder 28 is of the type which does not pass fluid except when it is operated. That insures that water does not drain from the fluid in tank 12 when the grinder is stationary.

As many possible embodiments may be made of the method, apparatus and product features of the above invention and as the art herein described might be varied in various parts, all without departing from the scope of the invention, it is to be understood that all matter hereinbefore set forth is to be interpreted as illustrative and not in a limiting sense.

I claim:
1. In a self-contained sewage treating system of the character described, the combination of, a treating tank within which a body of fluid comprising the sewage and water is held during treatment and providing an air circulation chamber above the body of fluid, macerator means to receive a sewage and water mixture and to macerate the same and deliver it to said treating tank, means to deliver the sewage and water mixture to said macerator means, motor-driven blower means to deliver air to said air circulation chamber, means to deliver air to the body of fluid in said treating tank to provide aeration at a high rate and to induce oxidization of the sewage and the evaporation of liquid, and heater means to maintain the body of fluid within said treating tank at the desired temperature, said blower means and said heater means cooperating to provide controlled evaporation of said aerated body of fluid.

2. A system as described in claim 1 which includes a clear water tank means interconnected with said treating tank by a relatively large opening, and wherein there is a bottom wall adjacent said opening onto which solids fall from the water and along which the solids pass toward the bottom of said treating tank, and means to withdraw water from said clear water tank means.

3. A self-contained sewage treating system of the character described comprising, a treating tank within which the sewage is held during treatment, macerator means to receive a sewage and water mixture and to macerate the same and deliver it to said treating tank, means to deliver the sewage and water mixture to said macerator means, air circulating means including means to deliver compressed air to the body of fluid in said treating tank to provide aeration at a high rate and to induce continuous circulation and agitation of the fluid, temperature control means including heater means to maintain the fluid within said treating tank at the desired elevated temperature, clear water tank means providing a body of relatively stratified water connected to said treating tank to permit water to flow freely thereto from said treating tank, and means to withdraw clear water from said clear water tank means and to deliver the same for flush water, said treating tank being open above the body of fluid to permit air circulation, said open treating tank air circulation and said temperature control means cooperating to maintain a desired rate of evaporation of the aerated water.

4. A system as described in claim 3 wherein said treating tank and said clear water tank means are interconnected by a relatively large opening and wherein there is a bottom wall adjacent said opening onto which solids fall from the water and along which the solids pass toward the bottom of said treating tank.

5. A system as described in claim 3 wherein said air circulating means includes air compressor means and air diffuser means connected thereto and positioned near the bottom of said treating tank.

6. A system as described in claim 3 wherein said treating tank has an air circulating chamber above the liquid level therein, and said air circulating means circulate air into and through said chamber.

7. A system as described in claim 6 wherein said air circulating means includes a motor driven blower directing air into said chamber and a vertical stack connected thereto for the discharge of the air.

8. Apparatus as described in claim 3 which includes a plurality of toilet units and a common waste line, and means to withdraw water from said clear water tank means and to deliver it to the remote end of said waste line to assist in the passage of the waste therealong.

9. A system as described in claim 8 which includes control means to deliver clear water to the remote end of said waste line in response to the initiating of a flushing operation of any of said toilet units.

10. A system as described in claim 3 which includes a first waste tank which is adapted to receive waste from a waste line, a second waste tank positioned above the level of said treating tank, pumping and piping means to deliver waste from said first waste tank to said second waste tank, and control means responsive to the fluid level in said second waste tank to start said macerator upon a predetermined rise in said liquid level and to stop said macerator upon a predetermined drop of said fluid level automatically.

11. A system as described in claim 3 wherein said means to withdraw clear water comprises ceramic filter units within said clear water tank means, pump means connected to said filter units, a tank to which clear water is delivered, and pipe means to deliver water therefrom to toilet units.

12. A system as described in claim 3 wherein said treating tank is generally oval in transverse vertical section with a curved bottom wall, and wherein said clear water tank means is positioned along one side of said treating tank with its bottom wall extending at an angle of the order of 45° to the horizontal, and wherein there is a rectangular opening at the lower edge of said last named bottom wall.

References Cited

UNITED STATES PATENTS

| | | | |
|---|---|---|---|
| 657,989 | 9/1900 | Madden | 4—91 X |
| 2,246,224 | 6/1941 | Streander | 210—305 X |
| 2,521,121 | 9/1950 | Kilpatrick | 210—257 X |
| 2,798,228 | 7/1957 | Boester | 210—152 X |
| 2,830,947 | 4/1958 | Griffith | 210—220 X |
| 2,858,939 | 11/1958 | Corliss | 210—152 X |
| 3,051,315 | 8/1962 | Boester | 210—220 X |
| 3,143,498 | 8/1964 | Fordyce et al. | 210—152 X |
| 3,272,338 | 9/1966 | Gallagher | 210—152 X |

FOREIGN PATENTS

| | | |
|---|---|---|
| 21,962 | of 1899 | Great Britain. |
| 368,433 | 5/1963 | Switzerland. |

REUBEN FRIEDMAN, *Primary Examiner.*

D. RIESS, *Assistant Examiner.*